Sept. 18, 1923.
L. A. AGOPIAN
1,468,251
PROCESS FOR OBTAINING VITAMINES
Filed Aug. 29, 1921
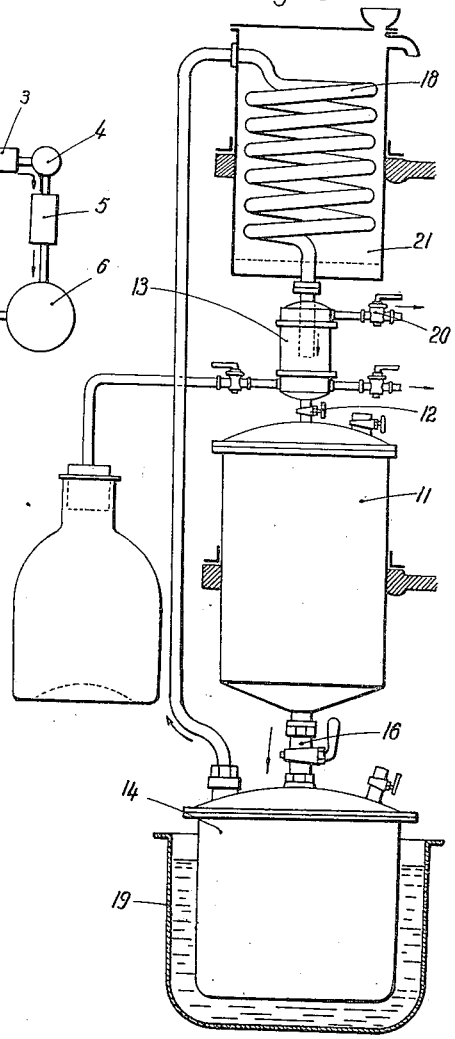
Inventor,
Levon A. Agopian
By Chas. J. Neill
Atty Patented Sept. 18, 1923.

1,468,251

UNITED STATES PATENT OFFICE.

LEVON ARAKEL AGOPIAN, OF PARIS, FRANCE.

PROCESS FOR OBTAINING VITAMINES.

Application filed August 29, 1921. Serial No. 496,611.

*To all whom it may concern:*

Be it known that I, LEVON ARAKEL AGOPIAN, Egyptian subject, residing at Paris, Department of the Seine, in France, and having P. O. address 95 Boulevard Malesherbes, in the said city, have invented certain new and useful Improvements in Processes for Obtaining Vitamines; and I do hereby declare the following to be a full, clear, and exact description of the invention, such as will enable others skilled in the art to which it appertains to make and use the same.

This invention has for its object a process which permits of the antiscorbutic vitamine being obtained in a chemically pure state, and which can be applied to the manufacture of very active preparations containing other vitamines such as the antineuritic (anti-beri-beri) vitamine, the antirachitic vitamine and the factors of the growth. The antiscorbutic vitamine which, up to the present time has never been isolated from numerous vegetables which contain it, is obtained when the process about to be described is employed, in the form of a definite product, perfectly characterized by its physical and chemical properties. This vitamine may also be manufactured in quantities as large as may be desired and is therefore a new industrial product forming an integral part of the invention.

The invention comprises likewise certain modifications of a simplified nature, which permit of complex preparations containing a great quantity of vitamine being obtained.

The raw material employed is constituted by the juice of fresh vegetables, obtained by crushing, maceration, pressure or in any other suitable manner. As soon as the juice is extracted from the vegetables, the enzymatic complex which it contains is treated by a reagent containing neutral salts of metals, such as copper, mercury, lead or silver, taken separately or in combination. The effect of this addition is to moderate the undesirable activity of enzymes and in particular the reactions such as oxidation and hydrolysis which would prevent the vitamine from being obtained.

The above operations like all others to which the liquid containing the vitamine is subjected, are conducted out of contact with atmospheric air in a hermetically closed apparatus which comprises amongst others, evaporating devices. The substance thus obtained is an amorphous powder which exerts a powerful curative action on the guinea pig. It is this powder which constitutes the raw material for obtaining the pure antiscorbutic vitamine.

The vitamine is extracted in vacuo by the aid of an apparatus of the "Soxhlet" type in which the powder is extracted by a suitable solvent such as ethyl alcohol or glycerine which, boiling in vacuo, circulates in a closed cycle at a temperature of about 30 degrees maintained by a water bath until colourless crystals are deposited, constituting the chemically pure antiscorbutic vitamine in the receiver containing the solvent.

The principal characteristics of this product which permit of identifying it in a certain manner are the following:—

The antiscorbutic vitamine is a complex glucoside which is obtained in transparent and colourless crystals.

The crystals are monoclinic when they are obtained by saturation of aqueous solutions of ethyl alcohol.

Their melting point lies between 44 and 48 degrees centigrade.

The solubility of the crystals in distilled water is 35 per cent at a temperature of 18 degrees. Although very soluble in ethyl alcohol at 25 degrees centigrade and in glycerine in solution of 25 per cent, they are practically insoluble in ethyl alcohol at 85 degrees or in 95 per cent glycerine.

The aqueous solution, which is colourless at the beginning, begins to decompose, turning yellow, after about six hours at a temperature of 18 degrees centigrade.

The crystals when dry, but in free contact with atmospheric air at a temperature of 18 degrees centigrade, begin to decompose turning yellow after about 20 hours.

The slowness of the decomposition is the greater the drier the atmosphere is and the resulting preparation is purer. The products of decomposition form a mass which is strongly hygroscopic. The crystals of the antiscorbutic vitamine are not hygroscopic. The crystals undergo an accelerated decomposition (hydrolysis and oxidation):—

1. By the action of heat above 46 degrees centigrade.

2. By the action of alkalies even in solutions which are very dilute. Example by a 1/100th normal solution of sodium carbonate taken in excess.

3. By the action of concentrated acids.

The products of decomposition are:

1. A sucromonose which is dextrorotary and forms an ozazone with phenylhydrazine heated to 100 degrees centigrade.
2. A substance which gives rise by oxidation to a strongly brown coloured organic acid.

This acid is strongly hygroscopic and is in particular more soluble in alcohol than the glucoside (i. e. the antiscorbutic vitamine).

It can be easily isolated in the form of a barium salt as an amorphous powder. Its sodium salt can be obtained in very hygroscopic brownish black crystals.

3. A white product of a bitter taste which is lævorotary and gives reactions of phenols (i. e. reduction in the cold of ammonium molybdate, the formation of a pink precipitate with Millon's reagent) and contains nitrogen. The solubility of this compound in ethyl alcohol is less than that of the glucoside (the intact antiscorbutic vitamine).

The accompanying drawing shows, by way of example and diagrammatically, a plant for carrying out the complete operation.

Figure 1 shows the whole of this plant.

Figure 2 represents the diagram of the "Soxhlet" apparatus for the extraction of the vitamine.

The apparatus comprises:

Figure 1, a hydraulic press 1, of the cage type, especially adapted to obtain the juice of peas out of contact with the atmosphere.

A preliminary evaporating boiler 2, working under reduced pressure and receiving the juice and the reagent.

A preliminary filter press 3 specially adapted.

A receiver 4 serving for the precipitation of the metals introduced in the course of the operation.

A second filter press 5 of the same pattern as the first one.

A second evaporating boiler 6.

A cooling apparatus 7 connected to the two evaporating boilers.

A vacuum pump 8 connected to the cooling apparatus.

An apparatus 9 for the purification of the commercial nitrogen introduced into the apparatus.

The nature of the material passing from the press 5 through the evaporator 6 is a filtrate which has lost its heavy metals in the receiver 4 under the action of sulfurated hydrogen and of the precipitate resulting from the filtration through the filter press. This liquid does not pass through the evaporator 6 but passes into it.

The refrigerator 7 is a condenser. On account of the suitable cooling of the condenser, the vapors coming from the evaporator 6 are condensed in the refrigerator 7, which results in the obtaining of a complete desiccation (state of powder) of the matter contained in the evaporator 6.

The reagent may be made as follows:

60 grams of neutral acetate of lead and 20 grams of acetate of copper are dissolved in the liter of water, carbonic acid being absent. This solution is introduced into the boiler through a special tap, at the time that the extracted juice from the vegetables flows into the hydraulic press I, 400 cubic centimeters of mixture being added.

The boiler 2 is provided with a mixer which continuously rotates in order to get a homogeneous mixture of the reagent and the juices. The precipitate so obtained is retained by the filter press 3.

An apparatus of copper for the extraction in vacuo of the "Soxhlet" type connected to the cooling apparatus.

It is in the second evaporating boiler that the powder is dried in vacuo at less than 4 millimetres of mercury and at a temperature of 35 degrees centigrade.

Figure 2 shows the treatment of tsis powder in the "Soxhlet" extraction apparatus. The powder V is placed in a shell 11 closed by a cock 12 communicating with the receiver 13, into which the solvent runs, the vapours of which rise from the vessel 14 and are condensed in the coil 18 surrounded by the cooler 21. After having traversed the powder contained in the shell 11, the solvent passes by a second tubulus 16 leading from the lower part of the shell 11 back to the vessel 14. The air in the apparatus is extracted by the aid of vacuum pump joined on at the cock 20. A water bath 19 into which the vessel 14 dips keeps the liquid at the desired temperature. The apparatus having been evacuated first, it is ascertained that the operations are taking place out of contact with air. The liquid contained in the vessel 14 sets up a circulation in a closed cycle as often as is necessary on the powder from which it extracts all the vitamine.

The vessel shown (Fig. 2) at the left of the receiver 11 is employed to recover the solvents used at the end of the operations (alcohol, ether, etc.).

The principles of the process which has just been described for the extraction of the antiscorbutic vitamine, may be applied to other kinds of vitamine. If so desired, for example, the antineuritic (anti-beri-beri) vitamine may be extracted, or the factors of its growth, by taking as the materials for extraction, yeast, with the exception of the higher vegetables. The operations, the object of which is to extract these kinds of vitamines, will comprise the treatment not only of the filtrate but also of the precipitate resulting from the reaction of the metallic salts on the free juices.

In this case benzole, ethyl ether, acetic ether, acetone and chloroform may be employed as solvents for the extractions of the vitamine.

Finally the operation may be simplified and in place of subjection to the amorphous powder resulting from the first part of the process hereinbefore described, dehydrated vegetables may be treated directly in the receiver of the "Soxhlet" apparatus. The extraction is carried out in vacuo by the solvents enumerated above, but at a temperature not exceeding 30 degrees centigrade. The vitamine thus obtained has not the same purity as that resulting from the use of the complete process, but it still is of such a quality as to permit of its use.

Claims:

1. The process of obtaining vitamines, substantially chemically pure, comprising first, the obtaining mechanically of the juices of fresh vegetables or yeast and immediately thereafter precipitating said juices by a reagent containing neutral salts of heavy metals, all of said operations being carried out in the absence of oxygen.

2. The process of obtaining vitamines, substantially chemically pure, comprising first, the obtaining mechanically of the juices of fresh vegetables or yeast, immediately thereafter precipitating said juices by a reagent containing neutral salts of heavy metals, next freeing the products of this treatment from the metals introduced and finally extracting said products by repeated washing with suitable solvents at a suitable temperature, all of said operations being carried out in the absence of oxygen.

In testimony whereof I affix my signature.

LEVON ARAKEL AGOPIAN.